United States Patent
Toki

(10) Patent No.: US 9,742,217 B2
(45) Date of Patent: Aug. 22, 2017

(54) CHARGE CONTROL APPARATUS AND CHARGE CONTROL METHOD

(71) Applicant: Nissan Motor Co., Ltd., Yokohama-shi, Kanagawa (JP)

(72) Inventor: Yoshimasa Toki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/318,326

(22) PCT Filed: Jun. 13, 2014

(86) PCT No.: PCT/JP2014/065735
§ 371 (c)(1),
(2) Date: Dec. 12, 2016

(87) PCT Pub. No.: WO2015/189983
PCT Pub. Date: Dec. 17, 2015

(65) Prior Publication Data
US 2017/0126052 A1    May 4, 2017

(51) Int. Cl.
*H02J 7/00* (2006.01)
*H02J 7/04* (2006.01)
*H02J 7/02* (2016.01)

(52) U.S. Cl.
CPC .............. *H02J 7/045* (2013.01); *H02J 7/022* (2013.01)

(58) Field of Classification Search
USPC ........................................................ 320/162
See application file for complete search history.

(56) References Cited

U.S. PATENT DOCUMENTS

| 2007/0075685 A1* | 4/2007 | Aradachi | H02J 7/0072 320/128 |
| 2013/0082519 A1 | 4/2013 | Nagakura et al. | |
| 2014/0015496 A1* | 1/2014 | Nishiguchi | H02J 7/007 320/162 |
| 2015/0236523 A1 | 8/2015 | Takano et al. | |

FOREIGN PATENT DOCUMENTS

| EP | 2899841 A1 | 7/2015 |
| JP | 2002034172 A | 1/2002 |
| JP | 2009022078 A | 1/2009 |
| JP | 2012019678 A | 1/2012 |
| WO | 2014046234 A1 | 3/2014 |

* cited by examiner

*Primary Examiner* — Robert Grant
(74) *Attorney, Agent, or Firm* — Young Basile Hanlon & MacFarlane, P.C.

(57) ABSTRACT

A charge control apparatus has a charger for charging a battery with rectified power obtained by rectifying AC power supplied from a power supply by full-wave rectification or half-wave rectification as charge power, a sensor for detecting a state of the battery, and controller for setting voltage lower than a limit voltage of the battery as an upper limit charge voltage chargeable to the battery. The controller manages the power chargeable to the battery on a basis of a detected value of the sensor and the upper limit charge voltage, controls the charge power on a basis of the chargeable power, sets the upper limit charge voltage to first upper limit charge voltage when the charge power is higher than a predetermined threshold value, and sets the upper limit charge voltage to second upper limit charge voltage when the charge power is lower than the threshold value.

4 Claims, 9 Drawing Sheets

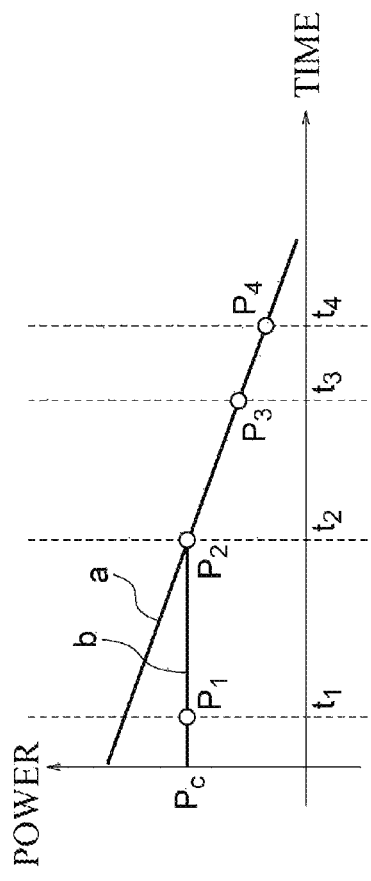
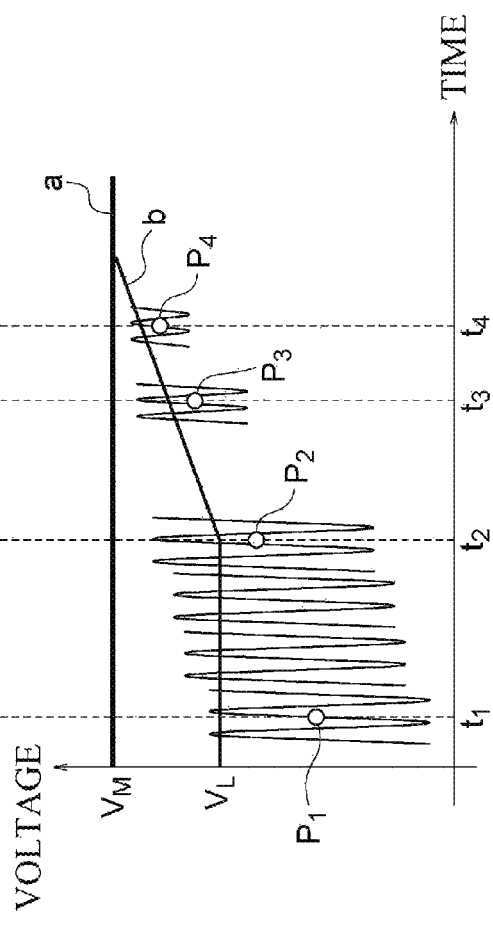
FIG. 6A
FIG. 6B

CHARGE CONTROL APPARATUS AND CHARGE CONTROL METHOD

TECHNICAL FIELD

The present invention relates to a charge controller apparatus and charge control method.

BACKGROUND

Under a condition where a battery is charged while limiting the power supplied from external AC power supply $P_{SUP}$ to allowable charge power $P_{LIM}$, and when drive of a PTC heater is requested and the PTC heater is driven in pulse drive by PWM control, the battery changes so that drive power of the PTC heater pulsates at a constant cycle by the PWM control. In such a case, for a part where drive power of the PTC heater is maximized, a battery charge system maintains a state in which charge power to the battery does not exceed the allowable charging power $P_{LIM}$ by discharging the battery In the conventional system described above, when driving with the PTC heater, by putting the battery into a discharge state so as not to allow charge power of the battery to exceed the allowable charging power $P_{LIM}$ by pulsation occurred by switching operation of the PWM control, charge voltage of the battery is controlled so as not to exceed the upper limit charge voltage. Also, by assuming that a size of pulsation due to switching operation of the PWM control is constant, charge power of the battery is controlled not to exceed the allowable charge power $P_{LIM}$.

Whereas, in a charge system for charging a battery while rectifying AC power by a full-wave rectifying method or half-wave rectifying method, charge power also pulsates along with rectification. In such charge system, when the battery is put into a discharge state so as not to allow charge voltage of the battery to exceed the upper limit charge power as in the above conventional system, the power actually charged to the battery (charge efficiency) decreases relative to the charge power and an amount of power that can be charged to a battery per unit hour decreases. More, while assuming that the size of pulsation is constant as in the conventional system, and when the upper limit charge voltage is limited low for the constant amount of pulsation in the above charge system, voltage chargeable to the battery becomes low relative to the actual pulsation magnitude. Subsequently, there are problems that the amount of power chargeable to the battery decreases and accordingly, and the amount of power charged to the battery decreases at completion of the charge.

SUMMARY

An object of the present invention is to provide a charge control apparatus and charge method providing a higher chargeable power amount of the battery for a system in which a battery is charged while rectifying AC power by full-wave rectification or half-wave rectification.

The present invention achieves the above objection by managing the power chargeable to a battery as chargeable power based on a basis of detected values of a sensor and upper limit charge voltage of the battery, controlling the charge power of the battery on a basis of the chargeable power, setting the upper limit charge voltage to first upper limit charge voltage when the charge power is higher than a predetermined threshold value, and setting the upper limit charge voltage to second upper limit charge voltage higher than the first upper limit charge voltage when the charge power is lower than the predetermined threshold value.

In the present invention, the upper limit charge voltage becomes higher as pulsation included in charge power becomes small. Accordingly, chargeable power to the battery becomes large, thus the amount of power chargeable to the battery can be increased while suppressing a decrease of charge efficiency.

DETAILED DESCRIPTION OF THE DRAWINGS

FIGS. 6A and 6B are graphs illustrating temporal transition of charge power and charge voltage of a battery in the charge system of FIG. 1;

DETAILED DESCRIPTION OF THE EMBODIMENTS

Modes for Carrying Out the Invention

Hereinafter, embodiments of the present invention will be described with reference to the drawings.

First Embodiment

Figure 1:
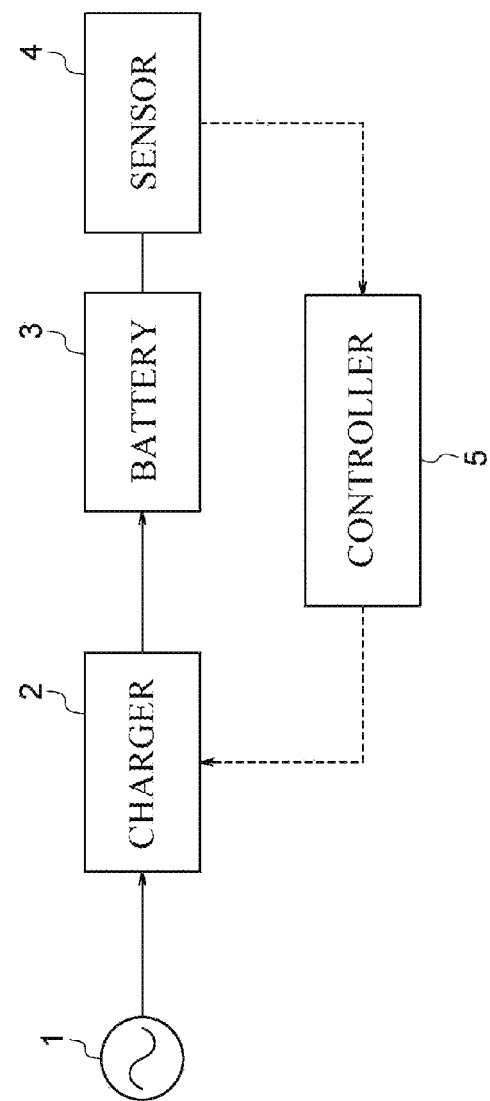
FIG. 1 is a block diagram of a charge system according to an embodiment of the present invention.

FIG. 1 is a block diagram of a charge system including a charge control apparatus according to an embodiment of the present invention. The charge system according to the present embodiment is a charge system utilizing an inverter of a full-wave rectification method or half-wave rectification method. The charge system includes an AC power supply 1, charger 2, battery 3, sensor 4, and controller 5.

The AC power supply 1 is, for example, 100V or 200V power supply for home use. The charger 2 rectifies AC power supplied from the AC power supply 1 with a half-wave rectifier or half-wave rectifier. Also, the charger 2 charges (outputs) the battery 3 with rectified direct-current power. The rectified direct-current power is output as charge power of the battery 3. The charger 2 has a rectifying function and includes an inverter or the like. Then, by driving the inverter of the charger 2 in accordance with a control signal sent from the controller 5, voltage and current charged from the charger 2 to the battery 3 are controlled.

The battery 3 is configured by connecting a plurality of secondary batteries. The sensor 4 is connected to the battery 3. The sensor 4 detects current (terminal current) and voltage (terminal voltage) of the battery 3 as detection values indicating a state of battery 3. The detection values of the sensor 4 are output to the controller 5.

The controller 5 is a controller for controlling charge of the battery 3 by controlling the inverter or the like included in the charger 2 on the basis of the detection values of the sensor 4. Specifically, the controller 5 calculates target values of charge power to the battery on the basis of the detection values of the sensor 4. The target values are indicated by charge current and charge voltage. The controller 5 controls the inverter or the like included in the charger 2 so that an effective value of the charge power (an effective power) becomes the target value.

Figure 2:
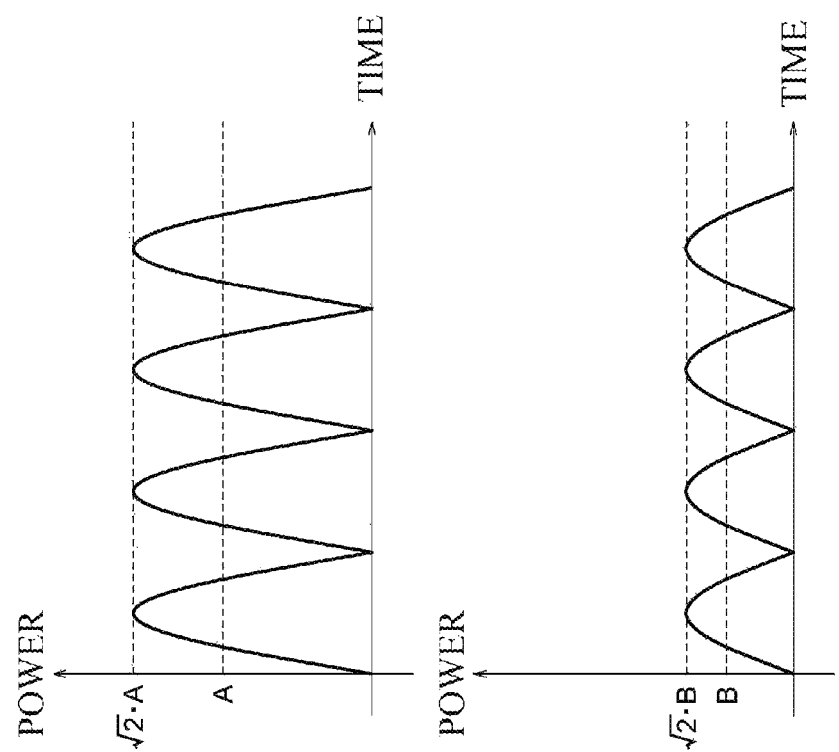
FIG. 2 is graphs for explaining pulsation in charge power of a battery in the charge system of FIG. 1.

In the following, charge power charged from the charger 2 to battery 3 will be described using FIG. 2. FIG. 2 is graphs illustrating a relation between effective value of the charge power (effective power) output by rectifying AC power by a full wave and pulsation component. As described above, the charger 2 uses an inverter of a full-wave rectification or half-wave rectification. Accordingly, a pulsating flow is generated to charge power of the charger 2 (charge power actually output from the charger 2). The magnitude of the pulsating flow of the charge power is proportional to the magnitude of effective power.

As illustrated in FIG. 2 when effective power is represented as A, a peak value of charge power can be represented with a value $\sqrt{2}$ times the effective power (A). The peak value of charge power corresponds to amplitude. More, when effective power is set to B (<A) which is lower than A, a peak value of charge power can be represented with a value $\sqrt{2}$ times the effective power (B). As illustrated in FIG. 2, as the effective power becomes low, the magnitude of pulsation also becomes small. Although, as described above, only the charge power output by rectifying AC power with a full wave is shown in FIG. 2, a pulsating flow is similarly generated also in a case where the AC power is output by rectifying the AC power with a half wave. However, for the charge power rectified with a half wave, a peak value of the charge power becomes a value two times the effective power. In the present example, explanation is made assuming that the charger 2 outputs AC power by full-wave rectification and description related to a case in which the AC power is output by half-wave rectification is omitted.

Further, a cycle of pulsation is two times a cycle of commercial frequency of the AC power supply 1. For example, in Japan, there are regions where the commercial frequency is 50 Hz and where the commercial frequency is 60 Hz. If the commercial frequency is 50 Hz, a pulsation cycle becomes 10 msec (100 Hz), and if the commercial frequency is 60 Hz, the pulsation cycle becomes 8 msec (120 Hz).

Figure 3:
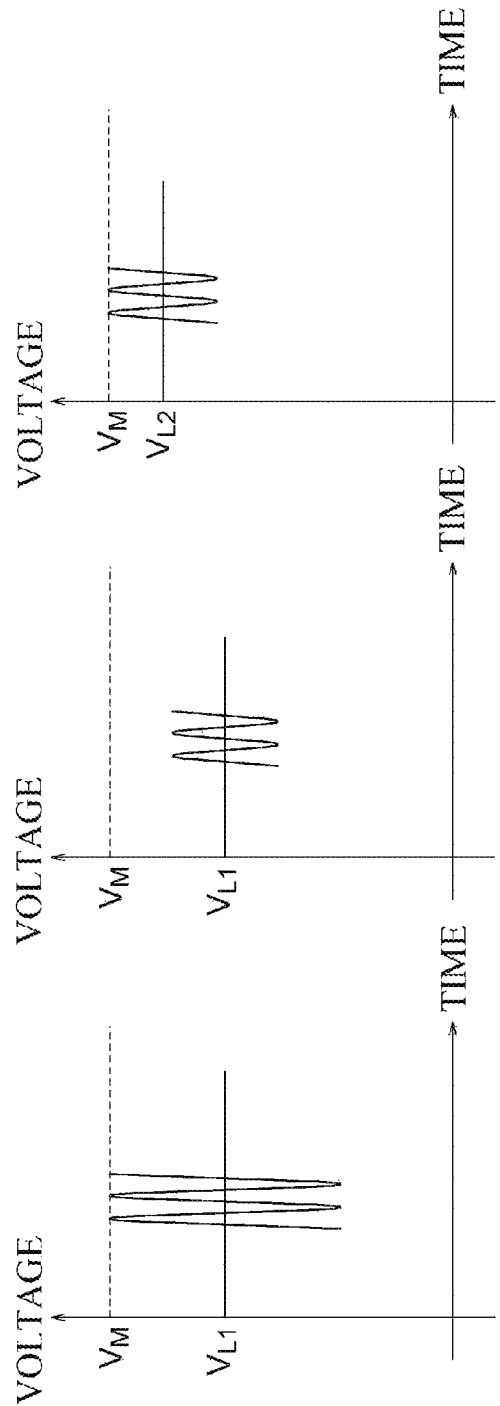
FIGS. 3A to 3C are graphs for explaining charge voltage property of a battery in the charge system of FIG. 1.

Next, using FIG. 3, a relation between upper limit charge voltage and charge power of the battery 3 will be described. FIG. 3 is graphs illustrating property of charge voltage of the battery 3. Graph (a) illustrates property when the battery 3 is charged with the effective power of 3 kW, and (b) and (c) illustrate properties when the battery 3 is charged with the effective power of 1 kW.

For the battery 3, in order to prevent deterioration of battery 3, its upper limit value for charge voltage is determined to be the limit voltage ($V_M$) in advance. The limit voltage is determined, for example, on the basis of such as voltage at which deposition of lithium starts when a lithium ion battery is used as battery 3.

As shown in FIG. 2, pulsation is generated to the charge power of the battery 3, and subsequently, pulsation is also generated in the charge voltage. Then, when a peak value of the charge voltage for the battery 3 instantaneously exceeds the limit voltage by pulsation, deterioration of the battery may proceed faster than usual. For this reason, the upper limit charge voltage for the battery 3 (the upper limit value in voltage control) is set to the voltage lower from the limit voltage of the battery 3 for the amount of voltage that corresponds to pulsation. Furthermore, the upper limit charge voltage for the battery 3 may be set to a voltage value lower than the limit voltage taking into account a margin including such as an error of the sensor 4 or the like.

Whereas, when the magnitude of pulsation (amplitude) does not change contrary to the embodiment, the voltage of the battery 3 can be charged up to the upper limit charge voltage while setting upper limit charge voltage of the battery 3 to a fixed value, and sufficient amount of power can be charged.

However, when the magnitude of the pulsation changes like in the embodiment, when the upper limit charge voltage of the battery 3 is set to a fixed value, a great limitation is added to the upper limit charge voltage of the battery 3 and battery voltage of the battery 3 (battery voltage at charge completion) becomes low. For example, assume that there is charge control to lower the charge power as charge of the battery 3 proceeds. As the charge proceeds, voltage of the battery 3 becomes high. Accordingly, the charger 2 reduces the charge current to lower the charge power for the battery 3. Since the charge power is reduced, pulsation becomes small.

For example, as shown in FIG. 3(a), when charge is performed with a charge power (effective power) of 3 kW while setting the upper limit charge voltage to $V_{L1}$, the magnitude of pulsation is large. Also, a peak value for the charge voltage of the battery 3 is substantially equal to the limit voltage ($V_M$). Assume that the charge power (effective power) is reduced from 3 kW to 1 kW from the state shown in FIG. 3(a). The effective power lowers for the amount of reduction in the charge power, and thus pulsation becomes small.

As shown in FIG. 3(b), for the amount of pulsation reduction, a peak value of charge voltage is lowered. However, since the upper limit charge voltage is fixed at $V_{L1}$, charge voltage cannot be raised. More, between a peak value of charge voltage and the limit voltage, a great voltage difference is generated. Accordingly, for the amount the pulsation is reduced, charge voltage can be raised. However, as for charge voltage of the battery 3, since its upper limit charge voltage is limited to $V_{L1}$, actual charge voltage for the battery 3 is greatly restricted with respect to its limit voltage ($V_M$). Further, for the amount the charge voltage for the battery 3 is not raised, the amount of power charged to the battery 3 is reduced. Furthermore, since the charge voltage for the battery 3 is low, the length of charge time becomes longer.

On the other hand, as shown in FIG. 3(c), when the upper limit charge voltage is raised from $V_{L1}$ to $V_{L2}$, for the amount the pulsation is reduced, the battery 3 is charged until charge voltage of the battery 3 reaches the upper limit charge voltage ($V_{L2}>V_{L1}$). Also, a peak value of the charge voltage for the battery 3 is kept to the limit voltage ($V_M$) or below.

Figure 4:
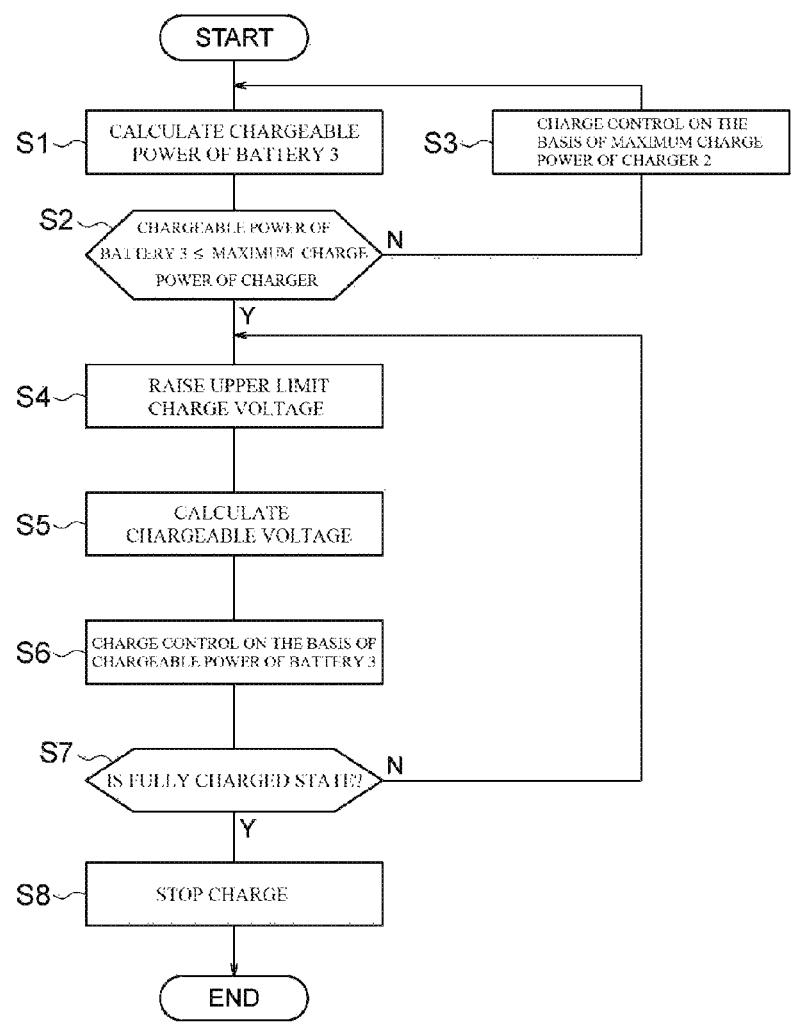
FIG. 4 is a flow chart illustrating a control sequence for a controller in FIG. 1.

The controller 5, by raising the upper limit charge voltage ($V_L$) in accordance with the magnitude of pulsation in charge power, charges the battery 3 while raising the power chargeable to the battery 3. In the following, using FIG. 4 to FIG. 6, control of the controller 5 is described. FIG. 4 is a flow chart illustrating a control sequence of the controller 5.

Figure 5:
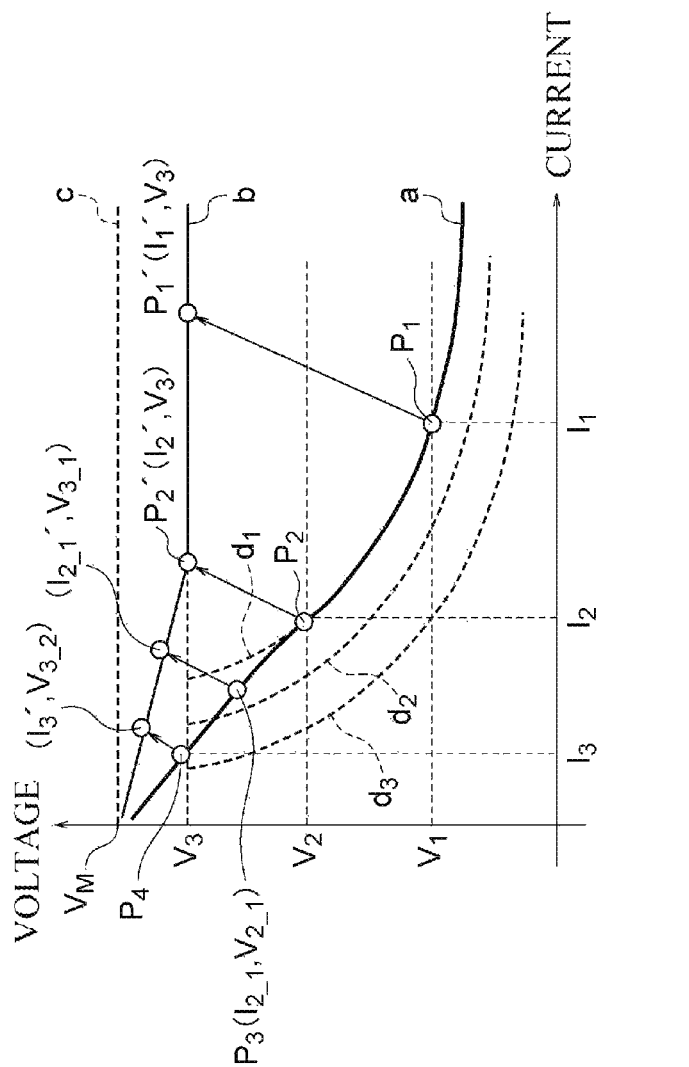
FIG. 5 is a graph for explaining transition of charge voltage and charge current of a battery in the charge system of FIG. 1.

FIG. 5 is a graph for explaining transition of charge voltage and charge current of the battery 3. In FIG. 5, graph a shows the transition of charge voltage and charge current of the battery 3 relative to transition of charge. The charge voltage and charge current of the battery 3 transit along the graph a as the charge proceeds. Graph b shows the upper limit charge voltage ($V_L$), graph C shows the limit voltage ($V_M$), and graphs $d_1$ to $d_3$ show equivalent power lines of the charge power charged to the battery 3 from the charger 2. The charge power becomes smaller in the order of graph $d_1$, graph $d_2$, and graph $d_3$.

FIG. 6(a) is a graph for explaining transition of charge power of the battery 3 and FIG. 6(b) is a graph for explaining transition of charge voltage of the battery 3. In FIG. 6(a), graph a illustrates chargeable power of the battery 3 and graph b illustrates the actual charge voltage (terminal voltage) of the battery 3. In FIG. 6(b), graph a illustrates limit voltage ($V_M$) and graph b illustrates the upper limit charge voltage ($V_L$).

Also, times ($t_1$ to $t_4$) shown in FIG. 5 and FIG. 6 correspond to states of a battery ($P_1$ to $P_4$) respectively and along with transition of charge, the time proceeds in an order of $t_1$, $t_2$, $t_3$, and $t_4$.

When charge of the battery 3 starts, a controller 5 calculates chargeable power of the battery 3 in step S1 on the basis of a detection value and upper limit charge voltage ($V_L$) of the battery 3 while detecting charge current and charge voltage of the battery 3 by using the sensor 4. The chargeable power is the charge power required to reach the upper limit charge voltage ($V_L$) from the present voltage of the battery 3.

Here, assume that charge start time is $t_1$ and a state of the battery 3 (initial state) at the time ($t_1$) is $P_1$. The state of the battery 3 ($P_1$) is represented by a dot ($P_1$) in FIG. 5. When the battery 3 is charged at the maximum charge power of the charger 2 in the state ($P_1$) of the battery 3, charge voltage of the battery 3 is $V_1$ and charge current of the battery 3 is $I_1$. The maximum charge power corresponds to graph d1.

The chargeable power is calculated from voltage and current of the battery 3 detected by the sensor 4 in the state ($P_1$) of the battery 3, internal resistance and upper limit charge voltage ($V_L$). An initial value for the upper limit charge voltage ($V_L$) is $V_3$, which is a voltage value obtained by subtracting voltage amplitude at the maximum charge power of the charger 2 from limit voltage ($V_M$). $V_M$ may be a value obtained by taking into account a margin such as a measurement error to voltage amplitude at the maximum charge power. More, the internal resistance may be calculated from a ratio of a change amount in the voltage of the battery 3 to a change amount in the current of the battery 3. First, an amount of current increase ($\Delta I$) indicates a increase amount of current allowed to flow until the voltage of the battery in the state ($P_1$) reaches the upper limit charge voltage ($V_3$). An amount of current increase ($\Delta I$) can be calculated by dividing a voltage difference ($\Delta V$) between the upper limit charge voltage ($V_3$) and the present voltage ($V_1$) by internal resistance of the battery 3 ($\Delta I=(V_3-V_1)/R$). Second, the amount of current ($I_1'$) indicates current of the battery 3 at the upper limit charge voltage ($V_3$) reached from the state ($P_1$). The current ($I_1'$) can be calculated by adding the amount of increase ($\Delta I$) to the current ($I_1$) ($I_1'=I_1-\Delta I$). Finally, chargeable power is calculated by multiplying the upper limit charge voltage ($V_3$) to the current ($I_1'$). The controller 5 calculates the chargeable power of the present state for the battery 3 in the above-mentioned calculation method.

In step S2, the controller 5 compares the chargeable power of the battery 3 with the maximum charge power of the charger 2. The maximum charge power of the charger 2 is the power determined in accordance with supply power from an AC power supply 1 and performance of the charger 2, and is the maximum power which can be charged (output) to the battery 3 from the charger 2. When the chargeable power of the battery 3 is greater than the maximum charge power of the charger 2, although the battery 3 is in a state in which charge power greater than the maximum charge power of the charger 2 can be used for the charge, the charge power is limited to the maximum charge power of the charger 2.

Accordingly, in the step 3, the controller 5 controls the charger 2 to use the maximum charge power from the charger 2 as an effective value of the charge power output from the charger 2. Specifically, charge control for the battery 3 is performed at constant power so that the charge power (effective power) supplied to the battery from the charger 2 becomes the maximum charge power of the charger 2. As the charge of the battery 3 proceeds, voltage of the battery 3 increases. Subsequently, the controller 5 reduces the charge current of the battery 3 along with an increase in the voltage of the battery 3, and the controller 5 controls the charger 2 so that the charge power to the battery 3 becomes the maximum charge power from the charger 2.

Then, by repeating the control flow of step S1 to step S3, charge control on the basis of the maximum charge power of the charger 2 can be performed at constant power. The charge control by a control loop of step S1 to step S3 is explained using FIG. 5 and FIG. 6 as follows.

The charge power of the battery 3 is on an equivalent power line shown as graph $d_1$ in FIG. 5 and the state of the battery 3 changes from the state ($P_1$) to state ($P_2$). As the charge proceeds, voltage of the battery 3 becomes higher and thus charge current for the battery 3 is reduced to $I_2$. Additionally, the current becomes $I_2'$ smaller than $I_1'$ at the time the charge voltage in the state ($P_2$) reaches the upper limit charge voltage ($V_3$). The current ($I_2'$) is the current allowed to flow at the upper limit charge voltage ($V_3$) reached from the state ($P_2$) reaches. More, the upper limit charge voltage ($V_L$) is fixed to a constant value ($V_3$). For this reason, as the charge proceeds, chargeable power of the battery 3 becomes small.

Next, as shown in FIG. 6(a), from the state ($P_1$) to state ($P_2$), charge power of the battery 3 changes at a same value of the maximum charge power (Pc) of the charger 2. More, since the charge power of the battery 3 is the maximum charge power of the charger 2, pulsation of the charge power is large. Although the charge voltage of the battery 3 becomes higher as the charge proceeds, charge voltage is low enough relative to the upper limit charge voltage ($V_3$). For this reason, as shown in FIG. 6(b), a peak value of the charge voltage is suppressed to the upper limit charge voltage ($V_3$) or below.

Further, with regard to the upper limit charge voltage ($V_L$) while the state changes from the state ($P_1$) to state ($P_2$), when the chargeable power of the battery 3 is greater than the maximum charge power of the charger 2, charge power of the battery 3 is limited to the maximum charge power of the charger 2. Also, charge voltage of the battery 3 is low enough from the limit voltage ($V_M$) of the battery 3. More, as shown in FIG. 6(b), by pulsation of the charge power, even when ripples (pulsation) are generated to voltage of the battery 3, a peak value of the voltage does not exceed the limit voltage ($V_M$). Accordingly, the upper limit charge voltage ($V_L$) is set to the fixed value of $V_3$.

Returning to FIG. 4, chargeable power becomes small along with the charge, and when chargeable power becomes the maximum power or lower, the process proceeds to step S4. In step S4, the controller 5 raises the upper limit charge voltage of battery 3 and sets the upper limit charge voltage to voltage higher than $V_3$. The upper limit charge voltage newly set is the voltage obtained by subtracting voltage for an amount of pulsation from the limit voltage ($V_M$). The voltage of the pulsation amount is calculated from charge power charged to the battery 3 from the charger 2 and internal resistance of the battery 3. The controller 5 can also calculate voltage of the pulsation amount since the controller 5 manages the state of the battery 3 and charge power of the charger 2. Additionally, the controller 5 may calculate the voltage of the pulsation amount by referencing a stored map or the like. The map stores charge power and magnitude of voltage pulsation (magnitude of voltage amplitude) relative to internal resistance obtained such as by experiments. Also, since the internal resistance of the battery 3 does not greatly change in a short time like charge time, the internal resistance of the battery 3 may be used as a constant value during the charge to calculate the voltage of the pulsation amount on the basis of the charge power. Then, the controller 5 calculates upper limit charge voltage to be set by subtracting voltage of the pulsation amount from the limit voltage ($V_M$).

As charge of the battery 3 proceeds and when chargeable power of the battery 3 becomes the maximum charge power of the charger 2 or below, the charge power of the battery 3 lowers along with change in the state of charge. More, as indicated above, as charge power of the battery 3 lowers, pulsation of the charge power also becomes small. Accordingly, voltage for the amount of pulsation which is subtracted from the limit voltage ($V_M$) also becomes small, and thus the upper limit charge voltage becomes higher. Further, the voltage for the amount of pulsation varies along with changes in the charge power that the upper limit charge voltage is also a variable value in the present example.

In step S5, the controller 5 calculates chargeable power. A method for calculating the chargeable power is the same as step S1. At this point, the upper limit charge voltage is higher than $V_3$, so that chargeable power of the battery 3 becomes greater.

In step S6, the controller 5 controls the charger 2 on the basis of the chargeable power of the battery 3. The controller 5 performs charge control for the battery 3 so that an effective value of the charge power charged to the battery 3 from the charger 2 becomes the chargeable power. In step S7, the controller 5 compares target voltage that indicates full charge of the battery 3 with detected voltage of the sensor 4, and judges whether or not the detected voltage of the battery 3 is lower than the target voltage. If the charge voltage of the battery 3 is lower than the target voltage, the controller 5 determines that the battery is not in a fully charged state and returns to step S4. Then, by repeating a control flow of step S4 to step S7, the upper limit charge voltage ($V_L$) rises in response to a decrease in pulsation, the chargeable power increases, and charge control on the basis of the chargeable power is performed.

The charge control by a control loop of step S4 to step S7 is explained using FIG. 5 and FIG. 6. As the charge proceeds and chargeable power of the battery 3 becomes small, power charged to the battery 3 from the charger 2 (charge power of the battery 3) becomes small. Accordingly, in a graph shown in FIG. 5, the state of the battery changes in the order of state ($P_3$) and state ($P_4$) off the equivalent power line ($d_1$).

As the charge proceeds, voltage of the battery 3 becomes higher. Accordingly, when the upper limit charge voltage ($V_3$) is a fixed value, chargeable power of the battery 3 becomes small. On the other hand, in the embodiment, the upper limit charge voltage ($V_3$) gradually becomes high as the charge proceeds. For example, when a state of the battery 3 changes from $P_2$ to $P_3$, the upper limit charge voltage increases from $V_3$ to $V_{3\_1}$. In the state ($P_3$) of the battery 3, charge voltage of the battery 3 is $V_{2\_1}$ and charge current is $I_{2\_1}$. Also, current allowed to flow until voltage of the battery 3 reaches the upper limit charge voltage ($V_{3\_1}$) becomes $I_{2\_1}'$. In other words, as the upper limit charge voltage becomes high from $V_3$ to $V_{3\_1}$, a voltage difference between the voltage ($V_{2\_1}$) of the state ($P_3$) and upper limit charge voltage ($V_L$) becomes large compared to a case in which the upper limit charge voltage is set to a fixed value of $V_3$. Additionally, the current allowed to flow from the state ($P_3$) of the battery 3 to the upper limit charge voltage becomes large compared to the case in which the upper limit charge voltage is set to a fixed value of $V_3$. Accordingly, chargeable power of the battery 3 increases compared to the case in which the upper limit charge voltage ($V_3$) is set to a fixed value.

Furthermore, similarly for a case in which the state of the battery 3 changes from $P_3$ to $P_4$, the chargeable power of the battery 3 becomes large compared to the case where the upper limit charge value ($V_3$) is set to a fixed value.

As shown in FIG. 6(a), from the state ($P_2$) of the battery 3, charge power to the battery 3 lowers as the charge of the battery 3 proceeds. Also, pulsation of the charge power gradually becomes small and accordingly, voltage amplitude (pulsation) also becomes small. As the charge proceeds, charge voltage of the battery 3 becomes high and so as the upper limit charge voltage ($V_L$). However, pulsation gradually becomes small. For this reason, as shown in FIG. 6(b), a peak value of the charge voltage is suppressed to the limit voltage ($V_M$) and below.

In other words, when the upper limit charge voltage is fixed to $V_3$, the battery 3 can only be charged up to a level at which the voltage of the battery 3 reaches the upper limit charge voltage ($V_3$). In contrast, in the embodiment, the controller 5 sets the upper limit charge voltage to $V_3$ when the charge power of the battery 3 is higher than the maximum charge power of the charger 2, and the controller 5 sets the upper limit charge voltage to $V_{3\_1}$ or $V_{3\_2}$, which is lower than $V_3$, when the charge power of the battery 3 is lower than the maximum charge power of the charger 2. Since the voltage of the battery 3 after charge becomes higher than $V_3$, the amount of power chargeable to the battery 3 can be increased.

As shown in FIG. 4, in step S7, when charge voltage of the battery 3 is target voltage or greater, the controller 5 determines that the battery 3 is in a fully charged state and the process proceeds to step S8. Then, the controller 5 stops charge of the battery 3 by stopping the charger 2, and a control sequence of the present example completes.

As mentioned above, in the embodiment, while the controller 5 manages chargeable power of the battery 3 on the basis of detection values of the sensor 4 and upper limit charge voltage of the battery 3, charge power of the battery 3 is controlled on the basis of the chargeable power. More, the controller 5 sets the upper limit charge voltage to $V_3$ when the charge power of the battery 3 is higher than the maximum charge power of the charger 2, and sets the upper limit charge voltage to a higher voltage than $V_3$ when the charge power of the battery 3 is lower than the maximum charge power of the charger 2. In this way, the charge power of the battery 3 becomes low and when pulsation of the charge power becomes small, the upper limit charge voltage increases. Subsequently, chargeable power of the battery increases and the amount of power chargeable to the battery can be raised.

Further, in the embodiment, the controller 5 raises the upper limit charge voltage as charge of the battery 3 proceeds when charge power of the battery 3 is lower than the maximum charge power of the charger 2. As the charge of the battery 3 proceeds, charge power of the battery 3 is lowered and thus pulsation gradually becomes small. Then, by corresponding amplitude of decrease in the pulsation to an amount of increase in the upper limit charge value, the amount of decrease in pulsation that gradually becomes small is assigned to the amount of increase in the chargeable power. In this way, the amount of power chargeable to the battery 3 can be increased.

Note, that the controller 5 may correct the chargeable power in accordance with a deterioration level of the battery 3, temperature of the battery 3, SOC of the battery 3 or the like. When internal resistance of the battery 3 is high due to the deterioration level, temperature, SOC and the like of the battery 3, a value of current allowed to flow until the voltage of the battery 3 reaches the upper limit charge voltage becomes small, and subsequently, the chargeable power also becomes small. For these reasons, for example, the controller 5 calculates chargeable power so that the chargeable power becomes small as the internal resistance becomes large while correcting the internal resistance in accordance with the deterioration level, temperature, SOC or the like of the battery 3. Note, that a temperature of the battery 3 can be detected by a temperature sensor.

Additionally, the controller 5 may correct the amount of increase in the upper limit charge voltage in accordance with the deterioration level, temperature, SOC or the like of the battery 3. When the internal resistance of the battery 3 is high due to deterioration level, temperature, SOC or the like of the battery 3, the magnitude of the pulsation in the charge power also becomes large. For this reason, for example, the controller 5 calculates upper limit charge voltage so that an amount of increase in the upper limit charge voltage becomes small as the internal resistance becomes large.

As shown in FIG. 5, as charge of the battery 3 proceeds, charge power of the battery 3 becomes small. Further, although upper limit charge voltage is raised in accordance with lowering charge power in the present embodiment, the upper limit charge voltage may be raised in accordance with the chargeable power of the battery 3, the upper limit charge voltage may be raised in accordance with the charge current of the battery 3, and the upper limit charge voltage may be raised in accordance with a voltage difference between the current voltage of the battery 3 and the limit voltage ($V_M$). For example, to set the upper limit charge voltage in accordance with the chargeable power of the battery 3, the controller 5 should set the upper limit charge voltage so that the upper limit charge voltage becomes higher as the chargeable power decreases. Also, for charge current of the battery 3 and a voltage difference between the current voltage of the battery 3 and the limit voltage ($V_M$), set them as done for the chargeable power.

More, although the upper limit charge voltage is changed, depending on whether or not the chargeable power of the battery 3 is larger than the maximum charge power of the charger 2 in the present embodiment while using the maximum charge power of the charger 2 as a threshold value, the threshold value is not necessarily the maximum charge power of the charger 2. For example, under a state in which chargeable power of the battery 3 is lower than the maximum charge power of the charger 2 and when charge power of the battery 3, that is, chargeable power of the battery 3, is higher than a predetermined power threshold value, the controller 5 sets the upper limit charge voltage to $V_x$. The controller 5 sets the upper limit charge voltage to $V_y$ when the charge power of the battery 3 is lower than the predetermined power threshold value. In this way, the embodiment can be applied also for a case in which a capacity of the battery 3 at full charge is small and when charge of the battery 3 cannot be started with the maximum charge power of the charger 2. Furthermore, for charge control following the state ($P_2$) shown in FIG. 5, variable control for the upper limit charge voltage on the basis of comparison between the charge power of the battery 3 and threshold value can be performed.

Also, the embodiment is applicable to constant voltage charge control and constant current charge control.

Figure 7:
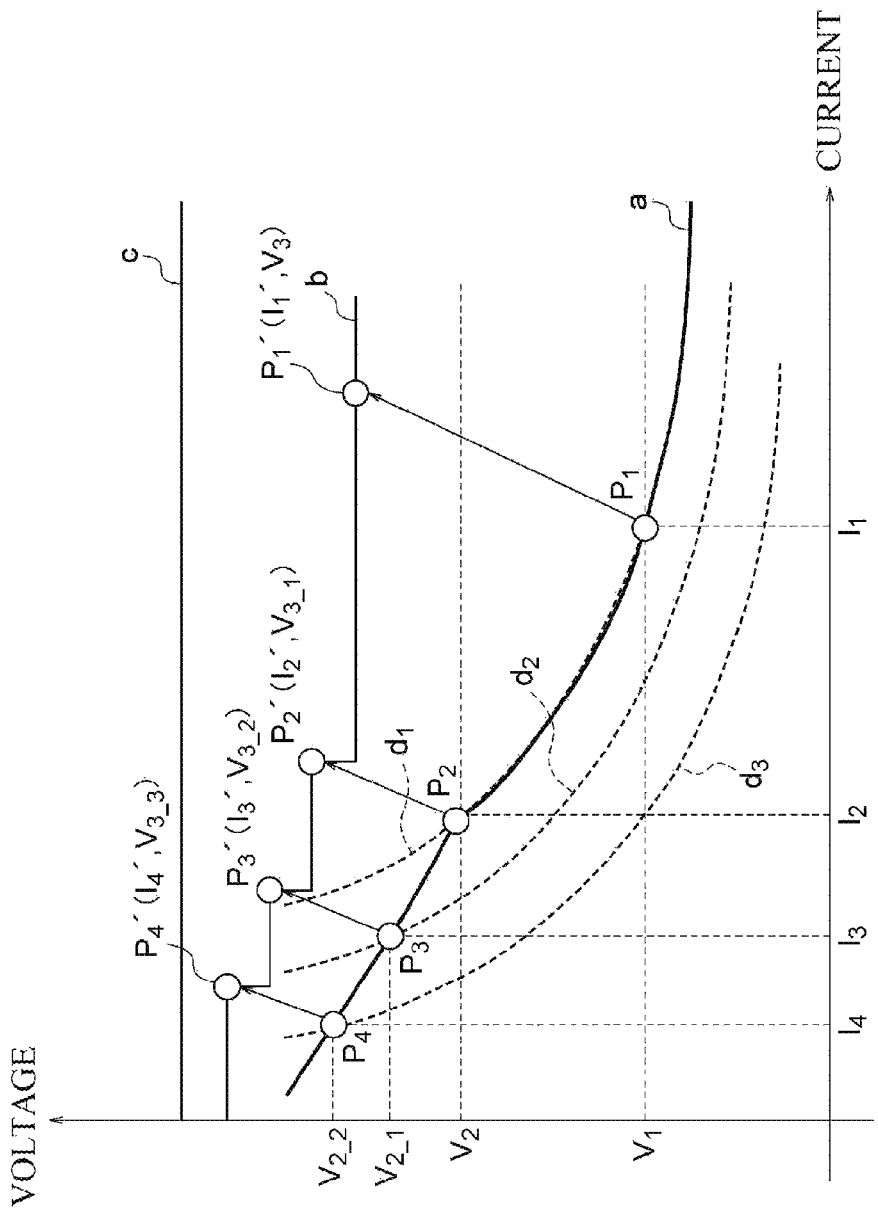
FIG. 7 is a graph for explaining transition in charge voltage and charge current of a battery in the charge system according to a modified example of the present invention.

Further, as a modified example of the embodiment, the controller 5 may discretely raise the upper limit charge voltage. FIG. 7 is a graph for explaining transition of the charge voltage and charge current of the battery 3 of a charge control apparatus according to the modified example. Each of the graphs a to c and graphs $d_1$ to $d_3$ is the same as the graphs shown in FIG. 5.

The controller 5 sets the upper limit charge voltage to $V_3$ as an initial value. $V_3$ corresponds to the state ($P_1$) of the battery 3. As charge of the battery 3 proceeds and when chargeable power of the battery 3 becomes lower than a first power threshold value of the charger 2, the controller 5 sets the upper limit charge voltage from $V_3$ to $V_{3\_1}$. The first power threshold value is a threshold value of the charge power set in advance and is set to a value lower than the maximum power threshold value of the charger 2. More, in FIG. 7, when chargeable power of the battery 3 is the first power threshold value, charge voltage of the battery 3 is $V_2$. Also, the upper limit charge voltage ($V_{3\_1}$) is higher than the upper limit charge voltage ($V_3$).

As charge of the battery 3 proceeds and when chargeable power of the battery 3 becomes lower than a second power threshold value of the charger 2, the controller 5 changes the upper limit charge voltage setting from $V_{3\_1}$ to $V_{3\_2}$. The second power threshold value is, like the first power threshold value, a threshold value of the charge power set in advance and is set to a value lower than the first power threshold value. More, in FIG. 7, when the chargeable power of the battery 3 is the second power threshold value, charge voltage of the battery 3 is $V_{2\_1}$. Also, the upper limit charge voltage ($V_{3\_2}$) is higher than the upper limit charge voltage ($V_{3\_1}$).

As charge of the battery 3 further proceeds and when chargeable power of the battery 3 becomes lower than a third power threshold value of the charger 2, the controller 5 changes the upper limit charge voltage setting from $V_{3\_2}$ to $V_{3\_3}$. The third power threshold value is, like the first and second power threshold values, a threshold value for the charge power set in advance and the third power threshold value is set to a value lower than the second power threshold value. More, in FIG. 7, when chargeable power of the battery 3 is the third power threshold value, charge voltage of the battery 3 is $V_{2\_2}$. Also, the upper limit charge voltage ($V_{3\_3}$) is higher than the upper limit charge voltage ($V_{3\_2}$). In this way, by discretely raising the upper limit charge voltage ($V_L$) as the charge of the battery 3 proceeds, an amount of power chargeable to the battery can be increased in the modified example.

The above-mentioned controller 5 corresponds to control means of the present invention.

Second Embodiment

In the following, a charge system according to another embodiment of the present invention is described. In this embodiment, compared to the first embodiment described above, control of charge power when changing the upper limit charge voltage to a higher voltage varies. Other configurations are the same as those mentioned in the first embodiment and their explanation is omitted.

Figure 8:
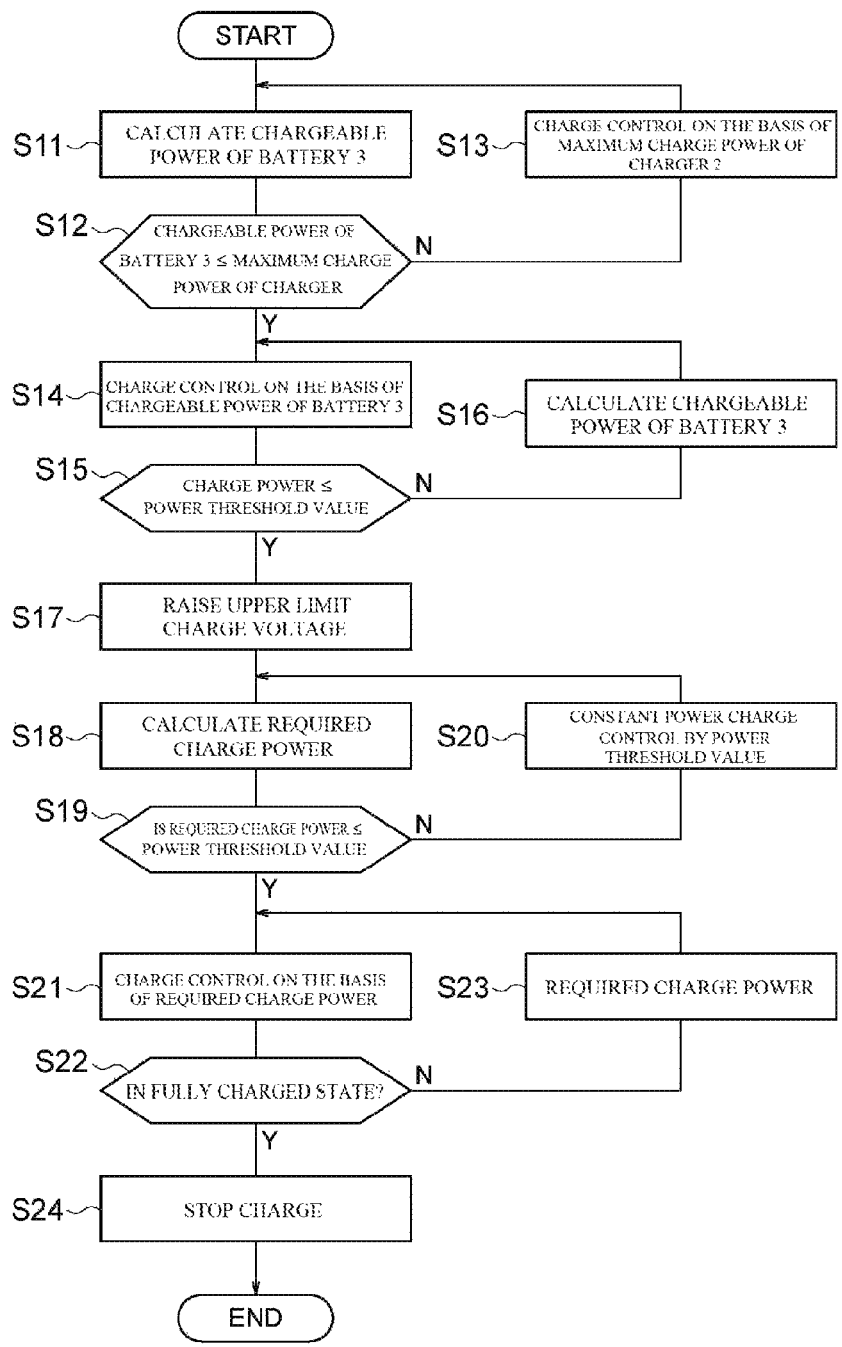
FIG. 8 is a flowchart illustrating a control sequence of a controller in a charge system according to another embodiment of the present invention.
Figure 9:
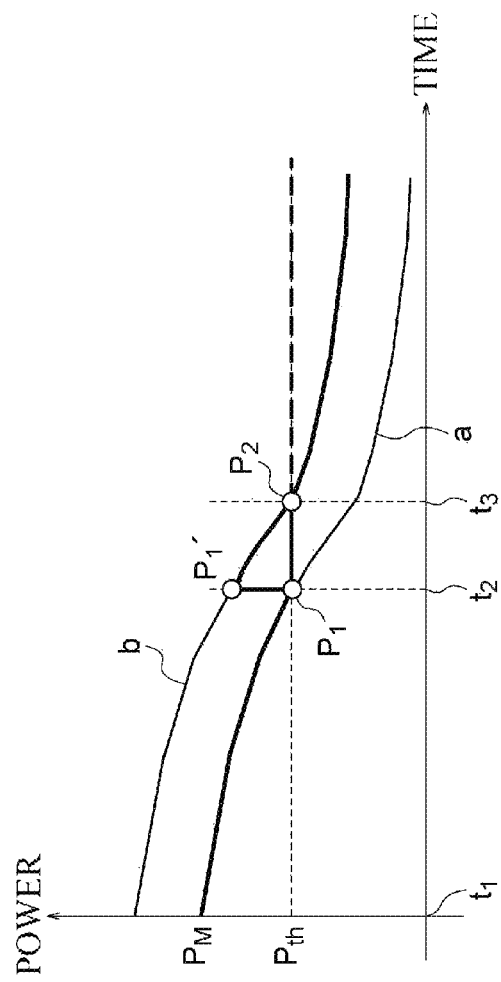
FIG. 9 is a graph illustrating temporal transition in charge power of a battery in a charge system according to another embodiment of the present invention.

Using FIG. 8 and FIG. 9, control of the controller 5 is explained. FIG. 8 is a flow chart illustrating a control sequence of the controller 5. FIG. 9 is a graph for explaining temporal transition of charge power of the battery 3.

A control sequence of step S11 to step S13 is the same as the control sequence of step S1 to step S3 according to the first embodiment, and thus their explanation is omitted.

In step S14, the controller 5 controls the charger 2 so that the charge power to be charged to the battery 3 from the charger 2 becomes the chargeable power. In step S15, the controller 5 compares the charge power with a power threshold value of the battery 3. The power threshold value is a threshold value of timing for changing the upper limit charge voltage represented in charge power and the power threshold value is set in advance. When the charge power of the battery 3 is higher than the power threshold value, the controller 5 calculates chargeable power of the battery 3 in step S16 and the process returns to step S14. In the charge control which corresponds to a control sequence between steps S14 to S16, the upper limit charge voltage is still set to the initial value ($V_p$).

When the charge power of the battery 3 is the power threshold value or below, the process proceeds to step S17. In step S17, the controller 5 changes the upper limit charge voltage from $V_p$ to $V_s$. The upper limit charge voltage ($V_s$) is higher than the initial value of the upper limit charge voltage ($V_p$). An amount of increase in the upper limit charge voltage is determined beforehand. However, at the time of step S17, charge power is not changed although the upper limit charge voltage is changed.

In step S18, the controller 5 calculates required chargeable power while detecting a present state of the battery 3 from detection values by the sensor 4. The required chargeable power is a chargeable power required to reach the upper limit charge voltage ($V_s$) from the current voltage of the battery 3 which indicates the present state of the battery 3. A method for calculating chargeable power is the same as the control sequence in step S11. Further, the chargeable power calculated in the control flow of step S18 is called as required charge power for convenience.

In step S19, the controller 5 compares the required charge power with power threshold value. The power threshold value is the same value as the power threshold value used in the control flow in step S15. When the required charge power is higher than the power threshold value, the process proceeds to step S20. In step S20, the controller 5 controls the charger 2 so that the charge power of the battery 3 becomes the power threshold value. Thus, the controller 5 controls charge of the battery 3 at constant power of the power threshold value. Then, the process returns to step S18.

Charge control by a control loop of step S14 to step S16 and charge control by a control loop of step S18 to step S20 are explained by using FIG. 9. When chargeable power of the battery 3 becomes a maximum charge power ($P_M$) of the charger 2 or below, which corresponds to time ($t_1$) in FIG. 9, charge power of the battery 3 is lowered. Following the time ($t_1$), the charge power of the battery 3 gradually becomes small as shown in the graph a. The graph a shows temporal transition of charge power when the chargeable power calculated on the basis of the upper limit charge voltage ($V_p$) is used as charge power. Also, the charge power of the battery 3 becomes equal to a power threshold value ($P_{th}$) at time ($t_2$). Charge power that changes in accordance with the control loop of step S14 to step S16 corresponds to the graph a between the time range of $t_1$ to $t_2$ in FIG. 9.

At time ($t_2$), the controller 5 changes the upper limit charge voltage from $V_p$ to $V_s$, which corresponds to step S17. In FIG. 9, $P_1$ shows a state of the battery at time ($t_2$). P1' shows a virtual state of the battery 3 when the charge power is raised to the required charge power at ($t_2$). The graph b shows temporal transition of the charge power when the chargeable power calculated on the basis of the upper limit charge voltage ($V_s$) is used as the charge power.

When the upper limit charge voltage becomes high, the chargeable power instantaneously becomes large. At this point, when the charge power is also instantaneously raised together with the chargeable power, a peak value of the charge voltage may become instantaneously higher than the limit voltage ($V_M$) as pulsation of the charge power becomes large. For this reason, in the embodiment, the charge power is not raised at a point (time $t_2$) when the upper limit charge voltage is raised and charge of the battery 3 is controlled at constant power with the charge power when the upper limit charge voltage is changed. Thus, a state of the battery 3 does not change from $P_1$ to $P_1'$. Also, the charge power shifts at a constant value of the power threshold value ($P_{th}$).

When charge is performed at a constant power of the charge power ($P_{th}$), voltage of the battery 3 increases. For this reason, as the charge proceeds, required charge power gradually decreases along the graph b in FIG. 9. From and after time $t_2$, the controller 5 uses lower power of the required charge power and power threshold value (hereafter, also called as select-low). For the time period between the time $t_2$ and time $t_3$, the controller 5 uses the power threshold value since the charge power of the battery 3 as the power threshold value is lower than the required charge power. The charge power that changes by a control loop of step S18 to step S20 corresponds to the graph a between the time $t_1$ to $t_2$ in FIG. 9.

Although the charge power is a constant value, the required charge power decreases along with increase in battery 3 voltage. Accordingly, at the time ($t_3$), the required charge power becomes equal to the power threshold value ($P_{th}$). In other words, in step S19, timing at which the required charge power becomes below the power threshold value corresponds to the time ($t_3$).

Back to FIG. 8, in step S19, when the required charge power becomes the power threshold value or below, the process proceeds to step S21. In step S21, the controller 5 controls the charger 2 so that the required charge power becomes the charge power of the battery 3. In step S22, the controller 5 determines whether or not the battery 3 became a fully charged state.

When the battery 3 is not in a fully charged state, the process returns to step S21 while the controller 5 calculates required charge power of the battery 3 in step S23. The required charge power is chargeable power on the basis of the upper limit charge voltage $V_s$. In the step S24, When the battery 3 is in a fully charged state, the controller 5 stops the charge of the battery 3 by stopping the charger 2 and the control flow of the present example completes.

As shown in FIG. 9, from and after the time ($t_3$), the required charge power becomes lower than the power threshold value. For this reason, even when charge control is performed so that the charge power becomes the required charge power, a peak value of the charge voltage does not exceed the limit voltage ($V_M$). Also, since chargeable power is calculated on the basis of the upper limit charge voltage after change and charge control is performed so that the charge power becomes the chargeable power, voltage of the battery 3 becomes high. As a result, the amount of power chargeable to the battery 3 can be increased.

As described above, in the present invention, the controller 5 calculates required chargeable power on the basis of the detection values of the sensor 4 and the upper limit charge voltage ($V_s$). The required chargeable power is chargeable power required to reach the upper limit charge voltage ($V_s$) from the present state of the battery 3. Then, when the charge power is the predetermined power threshold value ($P_{th}$) or below, the controller 5 uses lower power of the power threshold value ($P_{th}$) and required charge power as the charge power of the battery 3. In this way, a peak value of the charge voltage can be suppressed to a limit voltage ($V_M$) or below when the upper limit charge voltage is set to a high value.

Additionally, in the embodiment, from and after the time ($t_2$), a constant power value which can be set as charge power may be a power value lower than the power threshold value ($P_{th}$). Also, in the control flow of FIG. 8, control flow of step S19, step S20, and step S21 corresponds to control of select-low from and after the time $t_2$.

Further, although a variable for the upper limit charge voltage is set to one level in the embodiment, a plurality of variables may be used.

The above-mentioned upper limit charge voltage ($V_p$) corresponds to first upper limit charge voltage and the upper limit charge voltage ($V_s$) corresponds to second upper limit charge voltage.

DESCRIPTION OF REFERENCE NUMERALS

1 AC power supply
2 Charger
3 Battery
4 Sensor
5 Controller

What is claimed is:

1. A charge control apparatus for controlling charge of a battery comprising:
   a charger for rectifying AC power supplied from a power supply by full-wave rectification or half-wave rectification and charging the battery with rectified power as charge power of the battery;
   a sensor for detecting voltage and current supplied to the battery, the voltage and the current indicating a state of the battery; and
   a controller for setting voltage lower than limit voltage of the battery as upper limit charge voltage chargeable to the battery from the charger and controlling the charger, wherein the controller:
      manages power chargeable to the battery as chargeable power on a basis of a detection value of the sensor and the upper limit charge voltage;
      controls an effective value of the charge power on a basis of the chargeable power;
      sets the upper limit charge voltage to first upper limit charge voltage when the charge power is higher than a predetermined threshold value; and
      sets the upper limit charge voltage to second upper limit charge voltage when the charge power is lower than the predetermined threshold value, the second upper limit charge voltage being higher than the first upper limit charge voltage;
      calculates required charge power on the basis of the detection value of the sensor and the second upper limit charge voltage, the required charge power being the chargeable power required to reach the second upper limit charge voltage from a present state of the battery; and
      sets the lower of constant power and the required charge power to the charge power when the charge power is the predetermined threshold value or below, the constant power being equal to or lower than the predetermined threshold value.

2. The charge control apparatus according to claim 1, wherein the controller raises the upper limit charge voltage as charge of the battery proceeds when the charge power is lower than the predetermined threshold value.

3. The charge control apparatus according to claim 1, wherein the controller discretely raises the upper limit charge voltage when the charge power is lower than the predetermined threshold value.

4. A charge control method comprising:
   rectifying AC power supplied from a power supply by full-wave rectification or half-wave rectification and charging a battery with charge power of the battery by using a charger connected between the power supply and the battery, the charge power being power after the full-wave rectification or half-wave rectification;
   detecting voltage and current supplied to the battery by using a sensor connected to the battery, the voltage and the current indicating a state of the battery;
   setting voltage lower than limit voltage of the battery to upper limit charge voltage chargeable to the battery from the charger;
   controlling, while managing power chargeable to the battery as chargeable power on a basis of a detection voltage of the sensor and the upper limit charge voltage, an effective value of the charge power on a basis of the chargeable power;
   setting the upper limit charge voltage to first upper limit charge voltage when the charge power is higher than a predetermined threshold value;
   setting the upper limit charge voltage to second upper limit charge voltage when the charge power is lower than the predetermined threshold value, the second upper limit charge voltage being higher than the first upper limit charge voltage;
   calculating required charge power on the basis of the detection value of the sensor and the second upper limit charge voltage, the required charge power being the chargeable power required to reach the second upper limit charge voltage from a present state of the battery; and
   setting the lower of constant power and the required charge power to the charge power when the charge power is the predetermined threshold value or below, the constant power being equal to or lower than the predetermined threshold value.

* * * * *